J. W. JONES.
MAXIMUM HAND FOR SPEEDOMETER INDICATORS OR THE LIKE.
APPLICATION FILED MAY 18, 1907.

925,814.
Patented June 22, 1909.

Witnesses:
Gustave W Thompson
Ruth C. Fitzhugh.

Jas. W. Jones
Inventor
By Attorneys
Mauro Cameron Lewis Massie

UNITED STATES PATENT OFFICE.

JOSEPH W. JONES, OF NEW YORK, N. Y.

MAXIMUM-HAND FOR SPEEDOMETER-INDICATORS OR THE LIKE.

No. 925,814.      Specification of Letters Patent.      Patented June 22, 1909.

Application filed May 18, 1907. Serial No. 374,481.

*To all whom it may concern:*

Be it known that I, JOSEPH W. JONES, a citizen of the United States of America, and a resident of New York city, New York, have invented a new and useful Improvement in Maximum-Hands for Speedometer-Indicators or the Like, which improvement is fully set forth in the following specification.

This invention relates to indicating-devices, particularly to speed-indicating-devices.

The objects of the invention are to show the maximum indications of the device, and to provide convenient means for returning the maximum-hand to zero.

The invention will be best understood when described with reference to a speed-indicating-device such as the Jones speedometer, set forth in U. S. Letters-Patent No. 765,841, granted to me July 26, 1904.

The drawings annexed hereto illustrate a preferred form of the invention.

Figure 1:
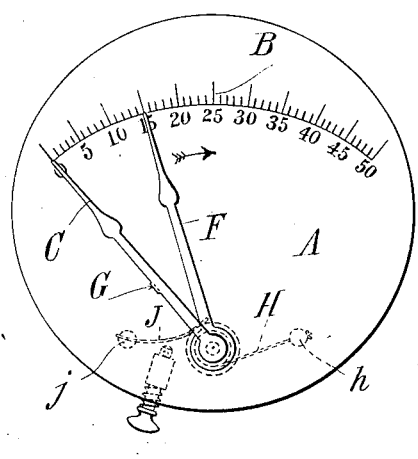
Figure 2:
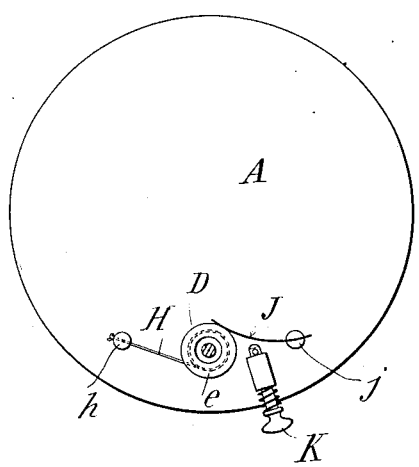
Figure 3:
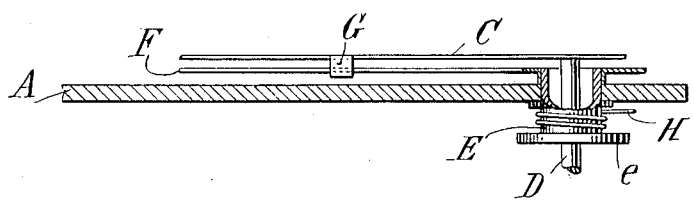

Figure 1 is a plan view of a speedometer equipped with my new maximum-hand; Fig. 2 shows the back of the dial of the same, removed from the apparatus; and Fig. 3 is a section of a detail.

In the drawings, A represents the dial-plate, showing the graduated markings B and the speed-indicating hand C. The latter is fast upon a shaft D, that extends from the works of the apparatus through an enlarged opening in the plate A. A short tubular shaft E surrounds shaft D loosely, and is journaled in the said opening in plate A. F, the "maximum-hand", is an ordinary pointer, and is made fast upon shaft E, so as to be pivoted concentrically with the speed-indicating pointer C. It is shown as lying between pointer C and the plate A. G is a small lug or finger on the side of the pointer C adapted, when the pointer swings in the direction indicated by the arrow (in Fig. 1), to carry the maximum-hand F along with it.

A spiral spring H is anchored at one end to a fixed post *h* on the plate A, while its other end is connected to the shaft E; whereby the spring tends to hold the maximum-hand F at the zero or normal position (at the left in Fig. 1), and will return the hand F to its zero position when permitted to do so. J is another spring, anchored at one end to a post *j* on the plate A, and bearing at its other end against the flange *e* of shaft E, so that its frictional pressure holds the latter and the maximum-hand F in whatever position they may be placed. The frictional force exerted by spring J is greater than the torsional force exerted by spring H; consequently, the maximum-hand F will not be retracted by spring H, unless and until spring J is moved out of contact with flange *e*.

K is a spring pressed plunger, seated in the cylindrical wall of the speedometer casing, and adapted (directly or indirectly) to push spring J away from flange *e* so as to permit spring H to retract the maximum-hand F.

The mode of operation of the device is obvious: As the pointer C is caused to travel over the dial face to indicate the increased rate of speed (to the right in Fig. 1), its finger G carries the maximum-hand F along with it. If the speed of the vehicle diminishes, the pointer C drops back (going all the way back to zero when the vehicle comes to a standstill) while the maximum-hand F remains pointing at the mark on the graduated scale that indicates the highest speed attained. Whenever desired, the plunger K is pressed inward, and its inner end releases the friction spring J, whereupon the torsion-spring H returns the maximum-hand F to alinement with the pointer C (whether the latter be at zero or at some intermediate position). Some of the advantages of this combination are apparent. For instance, if the question arise whether or not an automobile is exceeding the speed-limit, the maximum-hand F (preferably of a different color from the pointer C so as to be conspicuous) remains pointing to the maximum speed at which the vehicle has been traveling. Again, if the chauffeur in traveling through the country has gone at a permissible high rate of speed (exceeding the maximum speed allowed in a city or town), and on entering a town reduces his speed to the proper rate, so as to be traveling well within the speed-limits, and if the maximum hand F is not returned to alinement with the pointer C, the maximum-hand would not correctly indicate the maximum speed in the town, but would indicate a much higher speed. Consequently, it is essential that when speed is reduced under such circumstances, the maximum-hand should be at once returned to alinement, as by pressing the plunger K.

Changes in the construction and arrangement of the parts may be permitted without departing from the spirit of the invention. For instance, the maximum-hand might be so mounted as to lie above the pointer C, or in some different manner; some other arrangement than the spring H, or the spring J might be substituted; and some different device for returning the maximum-hand could be employed, without in any case departing from the spirit of my invention.

While I have described my invention with some particularity as connected with a speedometer, of course it can be employed with other indicating-devices.

Having thus described my invention, I claim:

1. The combination, in an indicating-device, of a dial, a pointer adapted to travel over said dial, a maximum-hand, means for advancing said hand with the pointer, means constantly tending to return said hand, a part having fixed connection with the maximum hand, a spring directly engaging said part and acting in opposition to said returning-means to retain said hand in any position to which it is advanced, and means for throwing said spring out of action and thereby freeing the hand to the action of the returning means.

2. The combination, in an indicating device, of a dial-plate, a pointer adapted to travel over the dial on said plate, a maximum-hand, a shaft journaled and supported in an opening in the dial-plate and to which said hand is fixed, means for advancing said hand with the pointer, a spring anchored at one end to the dial-plate and at its other end fastened to the shaft of the hand and constantly tending to rotate the shaft to return the hand, a part on the maximum-hand shaft, and means mounted upon the dial and engaging said part to retain said hand in any position to which it is advanced.

3. The combination, in an indicating-device, of a dial-plate, a pointer adapted to travel over the dial on said plate, a maximum-hand, a rotatable shaft to which said hand is fixed, means for advancing said hand with the pointer, a spring anchored at one end to the dial-plate and at its other end fastened to the shaft of the hand and constantly tending to rotate the shaft to return the hand, a part on the maximum-hand shaft, a second spring mounted upon the dial-plate and engaging said part to retain said hand in any position to which it is advanced, and means acting against the tension of said retaining-spring to disengage it from the part on the hand-shaft, thereby freeing said shaft and the hand to the action of the returning-spring.

4. In an indicating-device, a dial-plate, a pointer pivoted to swing over said dial-plate and having a depending finger, a tubular shaft journaled in said dial-plate and surrounding the axle of said pointer, a maximum-hand made fast on said shaft and adapted to be engaged by said finger, a spring anchored at one end to the dial-plate and at its other end to the shaft tending to return said maximum-hand to its initial position, a second spring mounted upon the dial-plate and acting to retain the maximum-hand in any position to which it is advanced, and means operable to throw said second spring out of action.

In testimony whereof I have signed this specification in the presence of two subscribing witnesses.

JOSEPH W. JONES.

Witnesses:
H. H. FITZ,
R. L. SCOTT.